(12) United States Patent
Ball, IV

(10) Patent No.: US 10,450,515 B2
(45) Date of Patent: *Oct. 22, 2019

(54) SEPARATION VESSEL WITH ENHANCED PARTICULATE REMOVAL

(71) Applicant: KBK Industries, LLC, Rush Center, KS (US)

(72) Inventor: Will D. Ball, IV, Bixby, OK (US)

(73) Assignee: KBK Industries, LLC, Rush Center, KS (US)

( * ) Notice: Subject to any disclaimer, the term of this patent is extended or adjusted under 35 U.S.C. 154(b) by 119 days.

This patent is subject to a terminal disclaimer.

(21) Appl. No.: 15/709,036

(22) Filed: Sep. 19, 2017

(65) Prior Publication Data

US 2018/0002614 A1  Jan. 4, 2018

Related U.S. Application Data

(63) Continuation of application No. 14/263,076, filed on Apr. 28, 2014, now Pat. No. 9,765,265.

(51) Int. Cl.
*C10G 33/06* (2006.01)
*B01D 17/02* (2006.01)
*B01D 21/24* (2006.01)
*B01D 19/00* (2006.01)
*B01D 21/26* (2006.01)

(52) U.S. Cl.
CPC .......... *C10G 33/06* (2013.01); *B01D 17/0211* (2013.01); *B01D 17/0214* (2013.01); *B01D 17/0217* (2013.01); *B01D 19/0057* (2013.01); *B01D 21/2405* (2013.01); *B01D 21/2472* (2013.01); *B01D 21/2494* (2013.01); *B01D 21/265* (2013.01); *B01D 2221/04* (2013.01)

(58) Field of Classification Search
CPC ........................ B01D 17/0211; B01D 17/0214
See application file for complete search history.

(56) References Cited

U.S. PATENT DOCUMENTS

| | | | |
|---|---|---|---|
| 2,998,096 A | 8/1961 | Snipes | |
| 4,120,795 A | 10/1978 | Laval, Jr. | |
| 4,424,068 A | 1/1984 | Mc Millan | |
| 5,073,266 A | 12/1991 | Ball, IV | |
| 5,080,780 A * | 1/1992 | Canzoneri | B01D 17/0205 210/104 |

(Continued)

*Primary Examiner* — Nam X Nguyen
*Assistant Examiner* — Julia L. Wun
(74) *Attorney, Agent, or Firm* — Leydig, Voit & Mayer, Ltd.

(57) ABSTRACT

A separation tank for crude oil. Fluid enters an inlet section of a center column of the tank via an offset inlet pipe so the fluid enters swirling. Solids that settle in the inlet section are removed by a center column drain and a solids removal system. Free gas rises and exits from the top of the tank. Liquid flows out of the center column via a diffuser that spirals the fluid evenly toward the wall of the tank where oil coalesces and wicks upward. Liquid flows downward around two flow diverting baffles where more oil coalesces and wicks upward via an oil conduit into the oil layer. The water flows under the lower flow diverting baffle and exits the tank through the outlet section. A large circular oil collector weir uniformly removes oil from the oil layer. Interface draw offs located below the oil-water interface remove excess BS&W.

13 Claims, 3 Drawing Sheets

(56) References Cited

U.S. PATENT DOCUMENTS

| | | |
|---|---|---|
| 5,711,374 A | 1/1998 | Kjos |
| 5,827,357 A | 10/1998 | Farion |
| 5,840,198 A | 11/1998 | Clarke |
| 6,042,722 A | 3/2000 | Lenz |
| 6,228,148 B1 | 5/2001 | Aaltonen et al. |
| 6,250,473 B1 | 6/2001 | Golightley et al. |
| 6,337,023 B1 | 1/2002 | Broussard et al. |
| 7,157,007 B2 | 1/2007 | Frankiewicz et al. |
| 7,374,668 B1 | 5/2008 | DiValentin et al. |
| 8,114,283 B2 | 2/2012 | Parkinson |
| 8,226,820 B1 | 7/2012 | Wegner |
| 8,257,588 B2 | 9/2012 | Mori et al. |
| 8,277,547 B2 | 10/2012 | Folkvang |
| 8,496,740 B1 | 7/2013 | Ball, IV |
| 9,199,251 B1 | 12/2015 | Ball, IV |
| 2003/0154860 A1 | 8/2003 | Milia |
| 2007/0084340 A1 | 4/2007 | Dou et al. |
| 2008/0251441 A1 | 10/2008 | Gibbs |
| 2010/0269696 A1 | 10/2010 | Sarshar et al. |
| 2013/0083620 A1 | 4/2013 | Hypes et al. |
| 2013/0199137 A1 | 8/2013 | Hallgren et al. |
| 2014/0275690 A1 | 9/2014 | Hernandez et al. |

\* cited by examiner

SEPARATION VESSEL WITH ENHANCED PARTICULATE REMOVAL

BACKGROUND OF THE INVENTION

1. Field of the Invention

The present invention is a separation vessel for separating gas, sediment, and water from crude oil for oil production that contains significant amounts of water.

2. Description of the Related Art

With oil prices hovering around $85-$100/barrel, current economics strongly favor separating and selling every drop of crude oil possible. Water production now dominates many oilfield operations, and too much oil remains entrained in it. The conventional API gun barrel separator tanks are the type of separation vessels that are often used to try to separate that oil. Those tanks were designed to remove small quantities of water from large quantities of oil, not small amounts of oil from large quantities of water. Today's high water cuts suggest that these old industry workhorses may be obsolete when large volumes of water are involved.

The present invention addresses this problem with a more sophisticated, a more complex, and a more expensive type of separator. However, at today's oil prices, the initial cost of installation of this more expensive type of separator is recovered in just a matter of days by the direct benefit of increased oil recovery achieved by this new separator design over the conventional gunbarrel vessels currently in use.

Also, there are other indirect cost savings associated with disposal of water effluent from the present invention verses disposal of water effluent from the conventional gun barrel vessel tanks currently in use. The oil that exits with the water effluent from the inefficient conventional gunbarrel vessels is disposed of with the water effluent into injection wells or disposal wells. The oil contained in that water effluent has a tendency to plate out on the tubular, the well liner, the well bore and the formation rock of the disposal well. Because the oil is water-insoluble, as it coats the formation face, it begins to restrict or plug the flow of water flowing from the well to the formation. Most of the suspended solids in the water accumulate in this oily material, increasing the volume of the deposit and causing even more plugging. This oily residue tends to build up in the formation within a few feet of the well bore and on the formation face, forming impervious flow paths that eventually cause injection pressures to climb and injection rates to decline.

As injection rates decline, it is common practice to stimulate the disposal well, often using a dilute solution of hydrochloric acid or other common stimulation solvents, usually with added surface active chemical ingredients. After the first stimulation, the result is that the well is returned to near its original injection rate and pressure. However, it is also common that after the first stimulation, injection rates fall off and injection pressures increase more rapidly than before. This situation becomes more severe after each subsequent stimulation effort until a point of diminishing returns is reached. Eventually, when stimulation efforts fail and the disposal well bore is obviously damaged beyond reclamation, it is then necessary to re-drill, sidetrack and recomplete the existing disposal well, or to drill a new disposal well. The costs for these more drastic measures range from $500,000 to $3,000,000. This is the indirect cost of poor water quality in the effluent from the oil water separators that are in use today.

With such staggering direct and indirect costs, it seems prudent to take positive steps to capture and sell as much of the entrained oil as possible in the crude oil stream, and to take steps to prevent well plugging from any and all other sources of contaminants such as solids, bacteria, etc.

One step is to select oil-water separation equipment that actually separates all physically separable oil from the produced water. The goal of the present invention is to provide a 20-30 fold increase in separation efficiency over conventional gunbarrel separating tanks. Conventional gunbarrel tanks will be only 3-5% hydraulically efficient at separating entrained oil, whereas the present invention is 60-72% hydraulically efficient at separating the entrained oil. The present invention reduces the oil concentration to below 50 ppm in the effluent water as compared to approximately 300-1500 ppm of oil in the effluent water emanating from conventional gunbarrel separation tanks.

SUMMARY OF THE INVENTION

The present invention is a separation vessel or tank with enhanced particulate removal for separating gas, water and particulates from crude oil. When the incoming fluid contains gas as one of the components, the tank is provided with an optional degassing boot designed to allowing all free gas to separate from the remaining liquid. This avoids the mixing that would occur in the tank if the gas was allowed to enter with the liquids. The degassing boot may be provided at the top of the center column or on the top of the tank before the fluid enters the vessel.

Then the incoming production fluid enters the vessel through an inlet pipe into a large diameter vertical pipe provided in the center of the tank that is referred to as the center column. The inlet pipe is attached to the center column in an offset manner so that the fluid enters the center column in a circular path to increase retention time within the center column.

The center column is divided into two vertical sections: the inlet section and the outlet section. The two sections are separated by a blanking plate. The inlet section extends from the top of the tank to the blanking plate that is installed within the center column just above the lower flow diverting baffle. The outlet section extends from the blanking plate to the bottom of the tank. The blanking plate is installed to divide the center column so the inlet fluid cannot flow directly to the outlet located below.

Heavier particulates entering with the fluid into the inlet section of the center column fall downward within the center column to the blanking plate and are periodically removed either by blow down through a center column drawing or via a solids removal system, such as a Tore solids removal system, that is installed within the center column above the blanking plate or via both means.

Any free gas that disengages from the remaining fluid flows upward within the center column and exits the center column via gas holes provided in the top of the center column and enters into a gas layer located at the top of the tank. Excess gas is removed from the tank via a gas outlet provided in the tank in communication with the gas layer. Also, there may be provided a degassing boot at the top of the center column, or on the top of the tank before the fluid enters the vessel.

The fluid flows out of the center column via a spiral swirl vane diffuser installed in the center column. The spiral swirl vane diffuser is provided with vertical curved or swirl vane baffles. The vertical curved or swirl van baffles will hereafter be referred to as inlet diverters. Each inlet diverter is secured between a horizontal quieting lower donut baffle and a horizontal quieting upper donut baffle, with adjacent inlet diverters spaced apart from each other. Inlet fluid slots are provided in the spiral swirl vane diffuser between adjacent inlet diverters. The inlet fluid slots communicate with the inlet section of the center column to allow fluid to flow out of the center column between the inlet diverters and into the interior of the tank. The inlet diverters serve to swirl the fluid as it flows out between them. As the fluid exits the center column, it turns from a vertical upward direction within the center column to a horizontal outward direction as it exits the center column through the spiral swirl vane diffuser to enter a primary separation zone within the tank.

The spiral swirl van diffuser distributes the fluid within the tank just below the oil-water interface through the diffuser's inlet diverters. These inlet diverters are curved to impart a centrifugal force on the liquids, spinning them outward from the center of the tank in an ever increasing radius spiral. This slows the velocity of the inlet fluid and increases its effective separation time in the primary separation zone just below the oil-water interface. As the inlet fluid stream slows, smaller and smaller droplets of oil separate and rise the short distance to the oil layer.

Some oil droplets accumulate on the top of the large area upper flow diverting baffle which serves also as a huge surface area coalescer. The upper flow diverting baffle is convex on its upper or top side and is concave on its lower or bottom side. As the fluid stream spirals outward away from the center of the tank, it encounters the interior tank wall that serves as another large area coalescer. Any droplets of oil attaching themselves to these coalescing surfaces are now no longer in the water. Instead, they are permanently separated from the water. As these surfaces become totally coated with oil, the oil wicks upward, eventually entering the oil layer above, adding to the volume of oil collected.

The oil layer is designed to provide adequate time for all accumulating oil to completely dehydrate to typical pipeline specification or better. Uniform oil collection is critical to this function. A very large oil collector in the center of the tank at the top of the oil liquid layer assures all oil rises uniformly through the entire oil layer, and is collected around 360 degrees of that layer. The large collector is designed with a very large spillover weir. Its height insures a minimum level deviation even during periods of very high slug rates. The level differential between the oil outlet and the downstream tank assures that large flow rates of oil can flow out of the tank's oil collector and oil outlet piping during slug flow conditions. Because of this, it is nearly impossible to overflow oil from the tank.

Once the bulk oil has separated from the main flow of inlet water, the water must turn 90 degrees downward to flow down between the upper flow diverting baffle and the tank wall. This causes a small measure of acceleration. As the downward flowing water reaches the outer edge of the upper flow diverting baffle, it enters a quadrant of the tank which is open to full diameter flow. The acceleration velocity creates a mild eddy current that pulls a portion of the water in and under the upper flow diverting baffle. At this point, all fluid flow changes to vertically downward through the entire cross sectional area of the tank. Velocity is now at its slowest, allowing the smallest of oil droplets to counter flow upward. These droplets rise, coating the concave bottom side of the upper flow diverting baffle. Once coated, the oil can migrate directly into the oil layer located above through a pipe or oil conduit that extends from the bottom side of the upper flow diverting baffle up into the oil layer just below the oil collector, thus preventing re-entrainment of oil in the water. This adds even more to the volume of oil collected and to the separation efficiency of the tank.

As the clarified water travels downward and nears the bottom of the tank, it encounters a large area lower flow diverting baffle. Like the upper flow diverting baffle, the lower flow diverting baffle is convex on its upper or top side and is concave on its lower or bottom side. As the downward flowing water impinges on this lower flow diverting baffle, oil droplets accumulate on its top surface, further enhancing separation. Additionally, this lower flow diverting baffle forces the flow stream to change directions from vertically downward to nearly horizontal again as the fluid turns to flow around the lower flow diverting baffle.

Now the water is flowing straight toward the inside surface or wall of the tank again. As it contacts the tank wall, some of the smallest oil droplets impinge on the wall, coating the wall and are wicked up into the oil layer above. Once again, separation efficiency is enhanced.

In order to exit the tank, the water must turn downward again to flow between the outer edge of the lower baffle and the tank wall. Since this area is a fraction of the tank cross section, the water must again increase in velocity as it turns downward. Any solids in the water at this point are now aimed directly at, and are being propelled directly toward, the bottom of the tank.

As the water reaches the outer edge of the lower flow diverting baffle, it must now turn upward more than 90 degrees and flow upward under the concave bottom side of the lower baffle. Solids, being heavier than water, are unable to change directions and thus settle to the bottom of the tank. The water flows along the bottom side of the lower flow diverting baffle where the tiniest droplets of oil have one last chance to coalesce and attach to this very large surface. Oil accumulating on the bottom side of the lower flow diverting baffle is allowed to exit through oil-dedicated weep holes provided extending through the top of the lower flow diverting baffle. That oil exits to the area under the upper flow diverting baffle, migrates upward until it contacts the bottom side of the upper flow diverting baffle and then flows through the oil conduit directly into the oil layer.

The water flowing under the lower flow diverting baffle now reaches the center of the tank and enters the outlet section of the center column via outlet holes provided in the center column below the blanking plate and below the lower flow diverting baffle. Once the water enters the center column through the outlet holes, it turns downward and flows down within the center column to enter a horizontal water outlet pipe which directs the water out of the tank and into an adjustable height water leg.

The separation tank is fitted with two internal tank drains. The first internal tank drain is the center column drain and the second internal tank drain is the set of interface draw offs.

The first internal tank drain is the center column drain. Incoming fluid often contains some solids. These solids will accumulate preferentially above the blanking plate. A center column drain is provided so the operator can drain this area. It should be drained frequently until the water leaving the drain line runs clear.

In order to drain the solids that accumulate above the blanking plate, it may be desirable, in addition to the center column drain, to include a solids removal system such as a Tore® solids removal system to aid the center column drain in removing solids from the inlet section of the center column. A Tore® solids removal system is a solids hydro-transportation device that utilizes the natural power of a motive fluid, such as water, to mobilize and transport solids, liquids or slurries. Tore® systems are available from PDL Solutions Ltd. located in the United Kingdom. The Tore® solids removal system includes a water inlet that feeds water to the Tore® solids removal system and a water and solids outlet from the solids removal system that drains a mixture of water and solids out of the inlet section of the center column.

The second internal tank drain is the set of interface draw offs. As oil accumulates, it is common that some BS&W (basic sediment and water, aka "emulsion") will accumulate immediately below or at the oil-water interface. The BS&W is heavier than pure oil because of the water and solids contained in it. Therefore, the emulsion will build downward from the normal oil-water interface level. About a foot below the normal oil-water interface level are several interface draw offs. These are approximately 24 inch round horizontal draw off baffles stacked approximately 4 inches apart so that each interface draw off has an upper draw off baffle separated from a lower draw off baffle with the area between the two draw off baffles open to the interior of the tank. A draw off pipe is connected to each of the lower draw off baffles and the individual draw off pipes are connected together and piped to a convenient elevation near the bottom of the tank where the draw off pipe exits the tank as the BS&W outlet. A BS&W valve is installed to open and closed the BS&W outlet on the piping. When the BS&W valve on the BS&W outlet is opened, the BS&W layer flows horizontally between the upper and lower draw off baffles of each interface draw off and out of the tank through the BS&W piping. When either clean water or clean oil is observed in the sample of the outlet fluid, the BS&W has been removed and the BS&W valve can then be closed.

Although not shown, a water leg is provided to maintain the proper fluid level within the tank. The water leg is added at the site of installation.

A water leg is a pipe within a pipe. The clarified water enters through the outer pipe and turns upward where it flows in the annular space between the two pipes. The inner pipe is sized for its circumference. The circumference of the outer pipe forms a spillover weir for the water with the inner pipe. The height of the top of the inner pipe establishes the weir that sets the oil-water interface level inside the separation tank. The height of this weir is critical. It is always adjustable, either by removing the upper removable center pipe nipple, or via an external adjustment assembly that slides a movable upper section of the inner pipe up and down to change its spillover elevation.

Sand removal systems can also be included in the bottom of the tank. These should be drained daily until clean water is observed.

DETAILED DESCRIPTION OF THE PREFERRED EMBODIMENT

Figure 1:
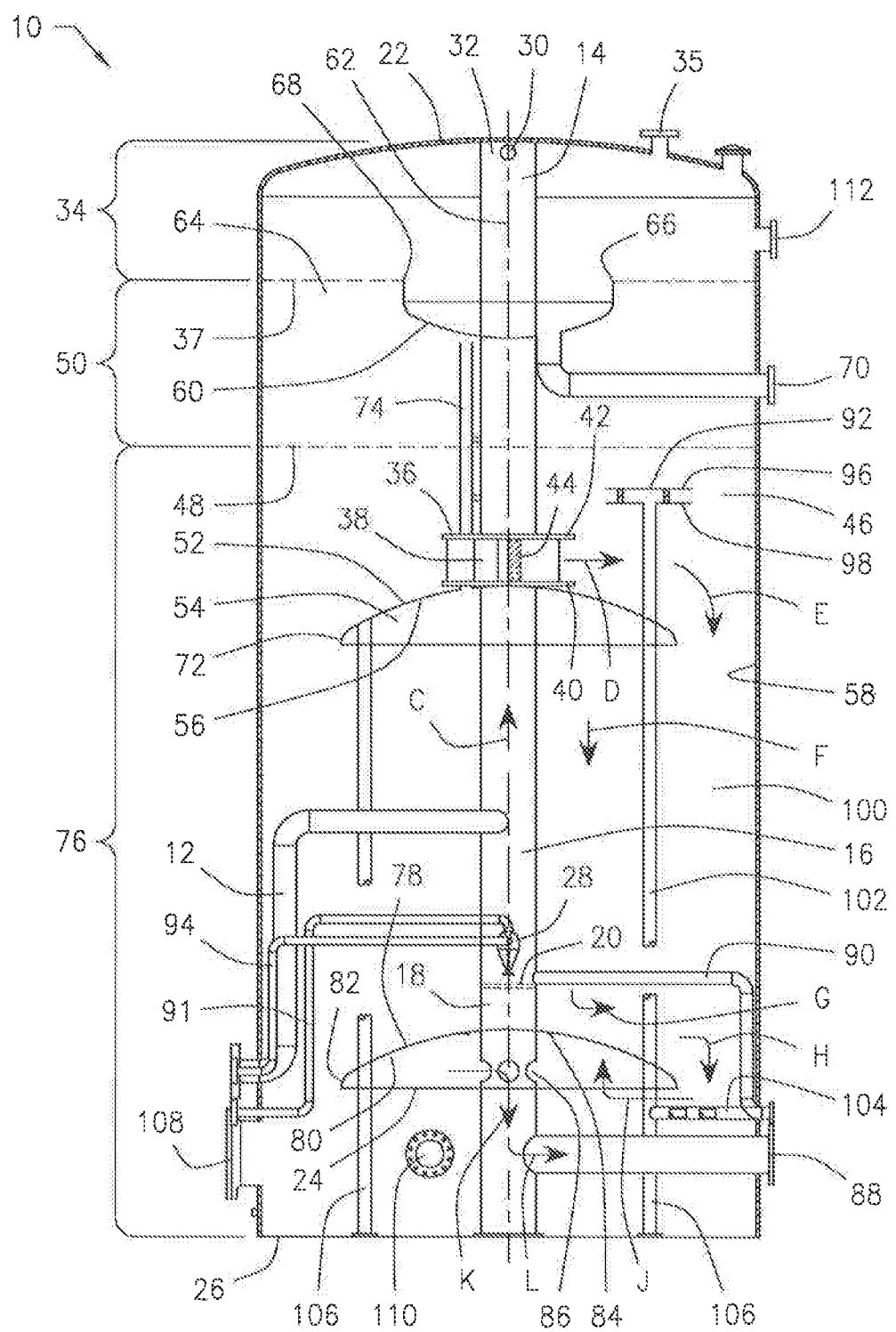
FIG. 1 is a diagram of the internal components contained within a separation vessel that is constructed in accordance with a preferred embodiment of the present invention.

Referring now to the drawings and initially to FIG. 1, there is shown a separation vessel or tank with enhanced particulate removal 10 that is constructed in accordance with a preferred embodiment of the present invention. The tank 10 is designed for separating gas, water and particulates from crude oil.

When the incoming fluid contains gas as one of the components, the tank 10 is provided with an optional degassing boot (not illustrated) to allow all free gas to separate from the remaining liquid. This avoids the mixing that would occur in the tank 10 if the gas was allowed to enter with the liquids. Also, there may be provided a degassing boot at the top of the center column, or on the top of the tank before the fluid enters the vessel.

Figure 3:
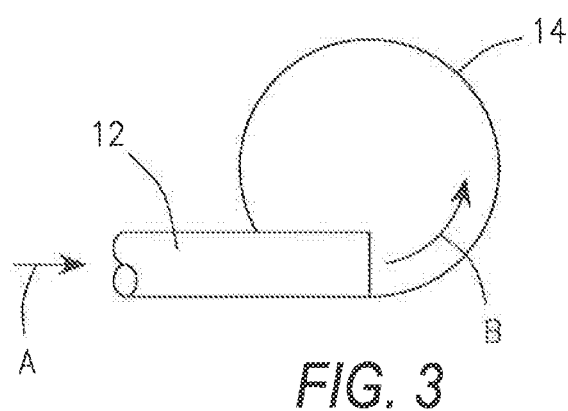
FIG. 3 is a top view showing the inlet pipe attached to the center column in an offset manner so that the fluid entering the center column travels in a circular path within the center column.

Then the incoming production fluid enters the tank 10 through an inlet pipe 12 into a large diameter vertical pipe provided in the center of the tank 10 that is referred to as the center column 14. Referring now to FIG. 3, the inlet pipe 12 is attached to the center column 14 in an offset manner so that the fluid enters the center column 14 in a circular path to increase retention time within the center column 14, as shown by Arrows A and B in FIG. 3.

The center column 14 is divided into two vertical sections: the inlet section 16 and the outlet section 18. The two sections 16 and 18 are separated by a blanking plate 20 that is installed within the center column 14 just above a lower flow diverting baffle 24 that is attached to the center column 14. The blanking plate 20 prevents fluid located within the center column 14 from passing directly between the two sections 16 and 18. The inlet section 16 extends from the top 22 of the tank 10 to the blanking plate 20. The outlet section 18 extends from the blanking plate 20 to the bottom 26 of the tank 10. The blanking plate 20 is installed to divide the center column 14 so the inlet fluid cannot flow directly to the outlet section 18 located below.

Heavier particulates entering with the fluid into the inlet section 16 of the center column 14 fall downward within the center column 14 to the blanking plate 20 and are periodically removed via a center column drain 90 provide above the blanking plate 20 or via a solids removal system 28, such as a Tore® solids removal system, that is installed within the center column 14 above the blanking plate 20 or by both means.

Any free gas that disengages from the remaining fluid flows upward within the center column 14 and exits the center column 14 via gas holes 30 provided in the top 32 of the center column 14 and enters into a gas layer 34 located at the top 22 of the tank 10 above the gas-oil interface 37. Excess gas is removed from the tank 10 via a gas vent 35 provided in the top 22 of the tank which is in communication with the gas layer 34 within the tank 10. Although not illustrated, there may be a degassing boot at the top 32 of the center column 14 or on the top 22 of the tank 10.

The fluid flows out of the center column 14 via a spiral swirl vane diffuser 36 installed in the center column 14. The spiral swirl vane diffuser 36 is provided with vertical curved or swirl vane baffles 38. The vertical curved or swirl vane baffles 38 will hereafter be referred to as inlet diverters 38. Each inlet diverter is secured between a horizontal quieting lower donut baffle 40 and a horizontal quieting upper donut baffle 42, with adjacent inlet diverters 38 spaced apart from each other. Inlet fluid slots 44 are provided in the spiral swirl vane diffuser 36 between adjacent inlet diverters 38. The inlet fluid slots 44 communicate with the inlet section 16 of the center column 14 to allow fluid to flow out of the center column 14 between the inlet diverters 38 and into the interior of the tank 10.

Figure 4:
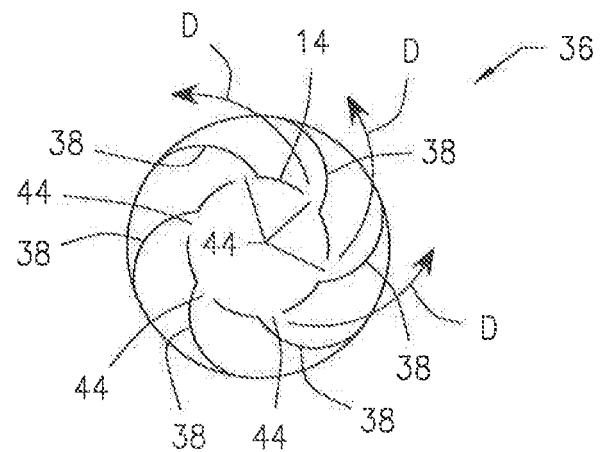
FIG. 4 is top plan view of the spiral swirl vane diffuser removed from the vessel of FIG. 1.
Figure 5:
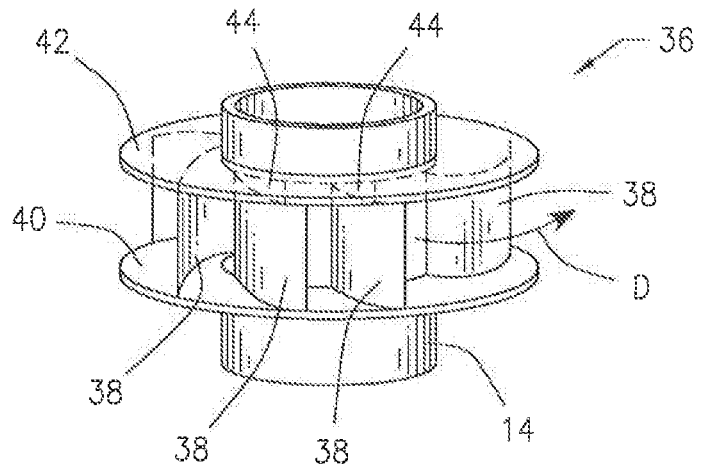
FIG. 5 is a top perspective view of the spiral swirl vane diffuser of FIG. 4.

Referring now to FIGS. 1, 4 and 5, the inlet diverters 38 serve to swirl the fluid as it flows out between them. As the fluid exits the center column 14, it turns from a vertical upward direction, as shown by Arrow C, within the center column 14 to a spiraling, horizontal outward direction, as shown by Arrows D, as it exits the center column 14 through the spiral swirl vane diffuser 36 to enter a primary separation zone 46 within the tank 10.

The spiral swirl vane diffuser 36 distributes the fluid within the tank 10 just below the oil-water interface 48 through the diffuser's inlet diverters 38. These inlet diverters 38 are curved to impart a centrifugal force on the liquids, spinning them outward from the center of the tank 10 in an ever increasing radius spiral, as shown by Arrows D. This slows the velocity of the inlet fluid and increases its effective separation time in the primary separation zone 46 just below the oil-water interface 48. As the inlet fluid stream slows, smaller and smaller droplets of oil separate and rise the short distance to the oil layer 50.

Some oil droplets accumulate on the top 52 of the large area upper flow diverting baffle 54 which serves also as a huge surface area coalescer. The upper flow diverting baffle 54 is convex on its upper side or top 52 and is concave on its opposite lower side or bottom 56. As the fluid stream spirals outward away from the center of the tank 10, it encounters the interior tank wall 58 that serves as another large area coalescer. Any droplets of oil attaching themselves to these coalescing surfaces 52 and 58 are no longer in the water, and are now permanently separated from the water. As these surfaces become totally coated with oil, the oil wicks upward, eventually entering the oil layer 50 above, adding to the volume of oil collected in the oil layer 50.

The oil layer 50 is designed to provide adequate time for all accumulating oil to completely dehydrate to typical pipeline specification or better. Uniform oil collection is critical to this function. A very large, concave, circular oil collector 60 provided in the center 62 of the tank 10 at the top 64 of the liquid oil layer 50 assures all oil rises uniformly through the entire oil layer 50, and is collected around 360 degrees of that layer 50. The upper edge 66 of the large oil collector 60 is designed to serve as a very large spillover oil weir 68 for oil. Oil from the oil layer 50 that passes over the oil weir 68 and into the oil collector 60 exits the oil collector 60 and the tank 10 via an oil outlet 70 that is attached to the oil collector 60.

The oil weir 68 is tall. Its height insures a minimum level deviation even during periods of very high incoming fluid slug rates. The level differential between the oil outlet 70 and a downstream tank assures that large flow rates of oil can flow out of the tank's oil collector 60 and oil outlet 70 during slug flow conditions. Because of this, it is nearly impossible to overflow oil from the tank 10.

Once the bulk oil has separated from the main flow of inlet water, the water must turn 90 degrees downward, as shown by Arrow E, to flow down between the upper flow diverting baffle 54 and the tank wall 58. This causes a small measure of acceleration. As the downward flowing water reaches the outer edge 72 of the upper flow diverting baffle 54, it enters a quadrant of the tank 10 which is open to full diameter flow. The acceleration velocity creates a mild eddy current that pulls a portion of the water in and under the upper flow diverting baffle 54. At this point, all fluid flow changes to vertically downward, as shown by Arrow F, through the entire cross sectional area of the tank 10. Velocity is now at its slowest, allowing the smallest of oil droplets to counter flow upward. These droplets rise, coating the concave bottom 56 of the upper flow diverting baffle 54. Once the bottom 56 is coated, the oil can migrate directly into the oil layer located above through a pipe or oil conduit 74 that extends from the bottom 56 of the upper flow diverting baffle 54 up into the oil layer 50 located just below the oil collector 60, thus preventing re-entrainment of oil in the water layer 76. This adds even more to the volume of oil collected and to the separation efficiency of the tank 10.

As the clarified water travels downward and nears the bottom 26 of the tank 10, it encounters the lower flow diverting baffle 24 which is a second large area on which oil can condense. Like the upper flow diverting baffle 54, the lower flow diverting baffle 24 is convex on its upper side or top 78 and is concave on its lower side or bottom 80. As the downward flowing water impinges on the top 78 of this lower flow diverting baffle 24, oil droplets accumulate on its top 78, further enhancing separation. Additionally, as shown by Arrow G, this lower flow diverting baffle 24 forces the flow stream to change directions from vertically downward to nearly horizontal again as the fluid turns to flow around the lower flow diverting baffle 24.

Now the water is flowing straight toward the inside surface or wall 58 of the tank 10 again. As it contacts the tank wall 58, some of the smallest oil droplets impinge on the tank wall 58, coating the wall 58 and are wicked up into the oil layer 50 above. Once again, separation efficiency is enhanced.

In order to exit the tank 10, as shown by Arrow H, the water must turn downward again to flow between the outer edge 82 of the lower flow diverting baffle 24 and the tank wall 58. Since this area is a fraction of the tank cross section, the water must again increase in velocity as it turns downward. Any solids in the water at this point are now aimed directly at, and are being propelled directly toward, the bottom 26 of the tank 10.

As shown by Arrow J the water reaches the outer edge 82 of the lower flow diverting baffle 24, it must now turn upward more than 90 degrees and flow upward under the concave bottom 80 of the lower flow diverting baffle 24. As the solids are heavier than water, they are unable to change directions and thus settle to the bottom of the tank 10. The water flows along the bottom 80 of the lower flow diverting baffle 24 where the tiniest droplets of oil have one last chance to coalesce and attach to the very large surface of the bottom 80. Oil accumulating on the bottom 80 of the lower flow diverting baffle 24 is allowed to exit through oil-dedicated weep holes 84 provided extending through the top 78 of the lower flow diverting baffle 24. That oil exits to the area under the upper flow diverting baffle 54, migrates upward until it contacts the bottom 56 of the upper flow diverting baffle 54 and then flows through the oil conduit 74 directly into the oil layer 50.

The water flowing under the lower flow diverting baffle 24 now reaches the center 62 of the tank 10 and enters the outlet section 18 of the center column 14 via outlet holes 88. The outlet holes are provided in the center column 14 just below the blanking plate 20 and below the lower flow diverting baffle 24. As shown by Arrow K, once the water enters the center column 14 through the outlet holes 86, it turns downward and flows down within the center column 14. As shown by Arrow L, from the center column 14, the water then turns horizontally to enter a horizontal water outlet pipe 88 which directs the water out of the tank 10 and into an adjustable height water leg that serves to regulate the height of the oil-water interface 48 located within the tank 10.

Figure 2:
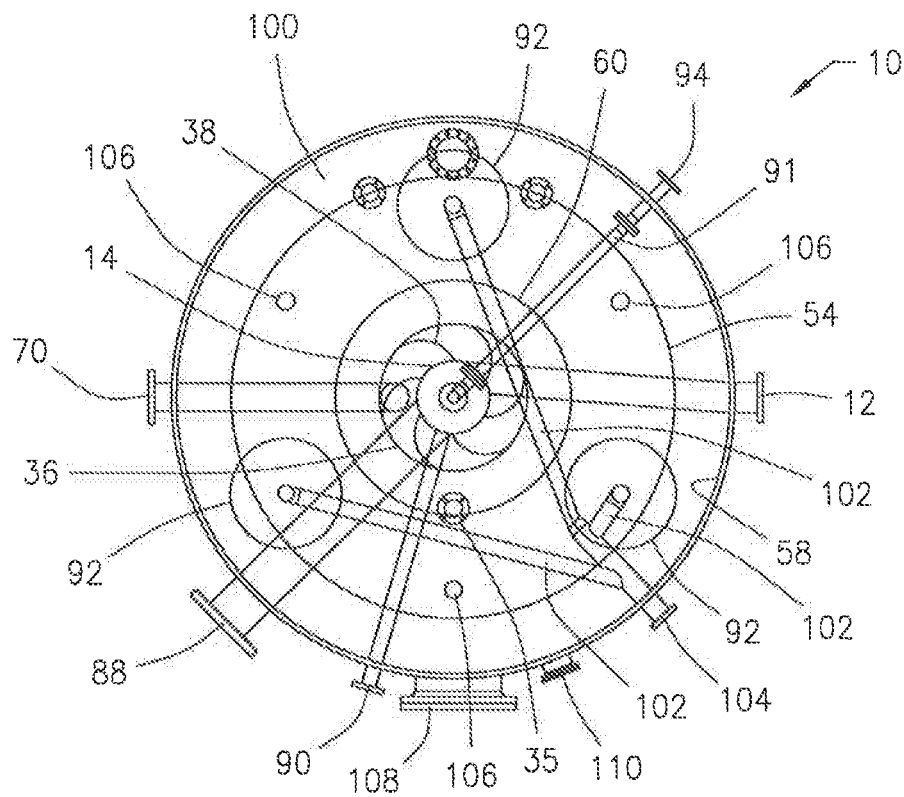
FIG. 2 is top view of the separation vessel of FIG. 1, showing the arrangement of the various internal components.

Referring to FIGS. 1 and 2, the separation tank 10 is fitted with two internal tank drains. The first internal tank drain is the center column drain 90 that is located near the solids removal system 28. The second internal tank drain is the set of interface draw offs 92.

The center column drain 90 is the first internal tank drain. Incoming fluid entering the tank 10 often contains some solids. These solids will accumulate preferentially above the blanking plate 20. The center column drain 90 is provided so the operator can drain this area. It should be drained frequently until the water leaving the drain 90 runs clear.

In order to drain the solids that accumulate above the blanking plate 20, it may also be desirable, in addition to the center column drain 90, to include a solids removal system 28, such as the Tore® solids removal system 28 to aid the center column drain 90 in removing solids from the inlet section 16 of the center column 14. A Tore® solids removal system 28 is a solids hydro-transportation device that utilizes the natural power of a motive fluid, such as water, to mobilize and transport solids, liquids or slurries. Tore® systems 28 are available from PDL Solutions Ltd. located in the United Kingdom. The Tore® solids removal system 28 includes a water inlet 94 that feeds water to the Tore® solids removal system 28 and a water and solids outlet 91 that drains a mixture of water and solids out of the inlet section 16 of the center column 14.

Figure 6:
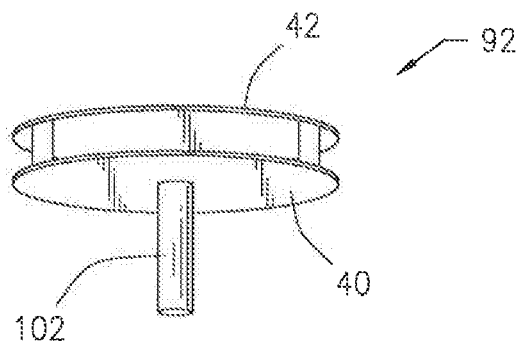
FIG. 6 is a bottom perspective view of one of the interface draw offs from FIG. 1.

Referring also to FIG. 6, the interface draw offs 92 collectively constitute the second internal tank drain. As oil accumulates in the tank 10, it is common that some BS&W (basic sediment and water, aka "emulsion") will accumulate immediately below or at the oil-water interface 48. The BS&W is heavier than pure oil because of the water and solids contained in it. Therefore, the emulsion will build downward from the level of the normal oil-water interface 48. Several interface draw offs 92 are provided in the tank 10 about a foot below the normal oil-water interface 48. Each interface draw offs 92 is constructed of an upper round horizontal draw off baffle 96 and a lower round horizontal draw off baffle 98, with each draw off baffle 96 and 98 being approximately 24 inch in diameter. The upper draw off baffle 96 is stacked on top of the lower draw off baffle 98 of each interface draw off 92 and the two draw off baffles 96 and 98 are spaced approximately 4 inches apart. The area between the upper and lower draw off baffles 96 and 98 is open to the interior 100 of the tank 10. A draw off pipe 102 is connected to each of the lower draw off baffles 98, and the individual draw off pipes 102 are connected together and piped to a convenient elevation near the bottom of the tank 10 where the pipe exits the tank 10 as the BS&W interface drain 104. A BS&W valve (not illustrated) is installed to open and closed the BS&W interface drain 104. When the BS&W valve on the BS&W interface drain 104 is opened, the BS&W layer flows horizontally between the upper and lower draw off baffles 96 and 98 of each interface draw off 92 and out of the tank 10 through the BS&W interface drain 104. When either clean water or clean oil is observed in the sample of the outlet fluid, the BS&W has been removed and the BS&W valve can then be closed.

The upper and lower flow diverting baffles 54 and 24 and the interface draw offs 92 are supported within the tank 10 by support legs 106 that extend down to the bottom 26 of the tank 10.

The tank 10 is provided with a cleanout man way 108 for providing access to the interior 100 of the tank 10 when it is out of service and also a heater man way 110 for installation of an immersion heater (not illustrated) within the tank 10.

Although not specifically illustrated, sand removal systems can also be included in the bottom of the tank 10. These should be drained daily until clean water is observed.

Although not illustrated, a water leg will be installed on site with the tank 10 as a means of regulating the fluid levels. The water leg is a pipe within a pipe. The clarified water enters through the outer pipe and turns upward where it flows in the annular space between the two pipes. The inner pipe is sized for its circumference. The circumference of the outer pipe forms a spillover weir for the water with the inner pipe. The height of the top of the inner pipe establishes the weir that sets the level of the oil-water interface 48 inside the separation tank 10. The height of this weir is critical. It is always adjustable, either by removing an upper removable center pipe nipple, or via an external adjustment assembly that slides a movable upper section of the inner pipe up and down to change its spillover elevation.

Installation and Operational Considerations

The separation tank 10 should have the gas phase piped to all other tanks being fed by the separation tank 10, including all oil tanks. If all tanks are not equalized, the gravity flow hydraulics will be disrupted and the tank 10 could overflow. Also, it is important to equalize all separation tanks 10 in a tank battery to assure proper flow.

The separation tank 10 is designed to operate when it is set straight and on true level. When this is not the case, the effluent qualities will suffer. Thus, it is important that all tanks 10 are set straight and level on a flat and level grade. it is recommended that the grades be shot with a transit before setting the tanks 10.

Also, although not illustrated, the correct spillover level of the inside pipe in the tank's water leg is calculated to within a fraction of an inch. If the water leg is set on a different elevation than it associated separation tank 10, the levels will be incorrect, and performance efficiencies will suffer dramatically.

When a new separation tank 10 is first put in service, it may take a while for it to accumulate enough oil to begin to put oil into a subsequent sales oil tank. Once it does, the lease operator should color cut the tank 10 to determine the thickness of the oil layer 50. It is typically 4-6 feet depending on the oil gravity, with heavier oil producing a thicker oil layer 50.

The oil layer 50 should be maintained at the desired elevation. If it deviates more than 12 inches from the desired elevation, the water leg must be adjusted to bring it into normal tolerances. In salt water disposal (SWD) plant applications, the trucked-in water may vary in its weight or specific gravity. In these instances, the water leg may need to be adjusted daily to optimize oil recovery. If this is the case, and the separation tank 10 is to be provided with a removable upper inside pipe water nipple, either several different length nipples should be cut and kept close by the water leg or the operator should order an external adjustment assembly and retrofit the water leg to make this adjustment fast and easy.

Sometimes the oil or water leaving the tank 10 may have excess BS&W, solids, or other contaminants due to the chemistry of the water. Physical separation systems, such as employed by the present invention, cannot compensate for this sort of issue. Thus, when this situation is observed, the assistance of a local oilfield chemical company must be secured.

Cold temperatures may cause oil to congeal and get so thick that water cannot separate from it. Applying heat will resolve this, but hot oiling fiberglass vessels, such as the present tank 10, is discouraged unless the tank 10 is constructed of high temperature resin. Otherwise, the maximum recommended temperature for fiber reinforced plastic (FRP) tanks is 120 degrees F. The best remedy is to transfer the oil to a separate steel tank and heat the oil in that separate tank before it enters the present separation tank 10.

Also, water, particularly fresh water, will freeze in many parts of the world due to the cold weather conditions encountered in those areas. Immersion heaters installed in the tank 10 near the bottom 26 of the tank 10 will prevent this. A heater man way 110 is provided in the tank for installing an immersion heater. Also, recirculating water constantly within the tank 10 will help prevent freezing. The greater the circulation rate, the lower the freeze point will be.

Since the present separation tank 10 is designed to prevent overflowing, if an overflow event occurs, the probable cause is either a closed valve or a plugged line. The tank 10 is provided with an emergency oil overflow outlet 112 for allowing oil to flow out of the tank 10 in these rare situations.

While the invention has been described with a certain degree of particularity, it is manifest that many changes may be made in the details of construction and the arrangement of components without departing from the spirit and scope of this disclosure, it is understood that the invention is not limited to the embodiments set forth herein for the purposes of exemplification, but is to be limited only by the scope of the attached claim or claims, including the full range of equivalency to which each element thereof is entitled.

What is claimed is:

1. A separation tank with enhanced particulate removal for separating gas, water, and particulates from crude oil comprising:
   a tank provided internally with a gas section at its top and a water section at its bottom with an oil section located between the gas section and the water section,
   means for discharging gas from the gas section,
   means for discharging particulates from the tank,
   said tank provided with a vertical center column, a blanking plate provided within the center column dividing the center column into an inlet section having a top and a bottom, the inlet section extending from the top of the tank down to the blanking plate, and an outlet section that extends from the blanking plate down to the bottom of the tank, an inlet pipe attached to the center column offset so that fluid entering the inlet section from the inlet pipe swirls in a circular fashion within the center column,
   a spiral swirl vane diffuser provided in the center column above the inlet pipe so that fluid flows out of the center column via the diffuser in an outwardly spinning and ever increasing spiral to slow the velocity of the fluid and increase its effective separation time within the water section,
   an oil collector weir provided at a top of the oil section of the tank to remove oil from the oil section and discharge it from the tank,
   an upper flow diverting baffle located below the spiral diffuser and a lower flow diverting baffle provided below the upper flow diverting baffle so that fluid flows downward within the water section around the two flow diverting baffles, wherein the upper flow diverting baffle is convex on its top side so as to permit at least a portion of the fluid flowing out of the center column to divert downward into the tank after the fluid exits the spiral swirl vane diffuser, and
   outlet holes provided in the outlet section of the center column under the lower flow diverting baffle such that fluid flows through the outlet holes into the outlet section of the center column under the lower flow diverting baffle to an outlet pipe to exit the tank.

2. A separation tank according to claim 1 wherein the means for discharging particulates from the tank further comprises:
   a center column drain provided at the bottom of the inlet section of the center column for removing solids that settle out of the crude oil in the inlet section of the center column.

3. A separation tank according to claim 1 wherein the means for discharging particulates from the tank further comprises:
   a solids removal system provided at the bottom of the inlet section of the center column for removing solids that settle out of the crude oil in the inlet section.

4. A separation tank according to claim 3 wherein the solids removal system further comprises:
   a solids hydro-transportation device that utilizes the power of a motive fluid to mobilize and transport solids, liquids, or slurries.

5. A separation tank according to claim 4 wherein the solids removal system further comprises:
   a water inlet connected to the solids hydro-transportation device to feed water to it and a water and solids outlet connected to the solids hydro-transportation device that discharges a mixture of water and particulates out of the tank.

6. A separation tank according to claim 1 wherein the means for discharging gas from the gas section further comprises:
   gas holes provided in the top of the inlet section of the center column to allow gas to exit the center column and enter the gas section of the tank, and
   a gas vent provided in the top of the tank and communicating with the gas section for venting gas from the tank.

7. A separation tank according to claim 1 further comprising:
   an oil conduit provided extending from a bottom side of the upper flow diverting baffle up into the oil section below the oil collection weir.

8. A separation tank according to claim 1 further comprising:
   interface draw offs provided within the tank below an oil-water interface, and
   said interface draw offs communicating with an interface drain for removing basic sediment and water (BS&W) from the tank.

9. A separation tank according to claim 8 wherein each interface draw off further comprises:
   an upper draw off baffle separated from a lower draw off baffle with the area between the two draw off baffles open to the interior of the tank, a draw off pipe is connected to each of the lower draw off baffles, the draw off pipe connected to a common draw off pipe that exits the tank as a BS&W outlet, and
   a BS&W valve attached to the BS&W outlet to open and close the BS&W outlet.

10. A separation tank according to claim 1 wherein the spiral swirl vane diffuser further comprises:

spaced apart vertical curved inlet diverters secured between a horizontal lower donut baffle and a horizontal upper donut baffle, and inlet fluid slots provided between adjacent inlet diverters such that the inlet fluid slots communicate with the inlet section of the center column to allow fluid to flow out of the center column between the inlet diverters and into the water section of the tank.

11. A separation tank according to claim 1 further comprising:

the upper flow diverting baffle is concave on its bottom side.

12. A separation tank according to claim 2 further comprising:

the lower flow diverting baffle is convex on its top side and is concave on its bottom side.

13. A separation tank according to claim 12 further comprising:

weep holes provided extending through the top side of the lower flow diverting baffle to permit oil to seep therethrough.

\* \* \* \* \*